(12) United States Patent
Uchiyama

(10) Patent No.: US 7,373,918 B2
(45) Date of Patent: May 20, 2008

(54) DIESEL ENGINE CONTROL SYSTEM

(75) Inventor: Ken Uchiyama, Toyoake (JP)

(73) Assignee: Denso Corporation, Kariya (JP)

( * ) Notice: Subject to any disclaimer, the term of this patent is extended or adjusted under 35 U.S.C. 154(b) by 338 days.

(21) Appl. No.: 11/225,899

(22) Filed: Sep. 14, 2005

(65) Prior Publication Data
US 2006/0054132 A1 Mar. 16, 2006

(30) Foreign Application Priority Data
Sep. 14, 2004 (JP) ............... 2004-266752

(51) Int. Cl.
F02B 3/00 (2006.01)
F02M 7/00 (2006.01)
(52) U.S. Cl. ..................... 123/299; 123/436
(58) Field of Classification Search ................ 123/295, 123/299, 300, 305, 435, 436, 479; 701/103–105, 701/111, 114; 73/116, 117.3
See application file for complete search history.

(56) References Cited
U.S. PATENT DOCUMENTS
5,642,705 A * 7/1997 Morikawa et al. .......... 123/300

6,328,014 B1 * 12/2001 Bradshaw .................. 123/300
6,755,176 B2 * 6/2004 Takeuchi et al. ............ 123/299
6,962,140 B1 * 11/2005 Nakai et al. ................ 123/436
7,120,536 B2 * 10/2006 Peron et al. ................ 701/114

FOREIGN PATENT DOCUMENTS
EP 1 362 174 6/2005

OTHER PUBLICATIONS
Office Action issued Nov. 23, 2007 in corresponding CN application No. 200510099295.3 and at least partial English Translation thereof.

* cited by examiner

Primary Examiner—Willis R. Wolfe, Jr.
(74) Attorney, Agent, or Firm—Nixon & Vanderhye P.C.

(57) ABSTRACT

When a learning condition is satisfied, an operational state of an engine is adjusted in a retarded combustion operation to a misfire inducing state, at which misfire is prone to occur in a cylinder of the engine due to shortage of a pilot flame generative injection quantity. When the misfire is sensed, the pilot flame generative injection quantity of the misfired cylinder is progressively increased. Then, when the misfire is eliminated through this, a pilot flame generative correction quantity at the time of eliminating the misfire is stored. Thereafter, the pilot flame generative injection quantity is corrected based on the stored pilot flame generative correction quantity.

23 Claims, 12 Drawing Sheets

TIME OF NORMAL COMBUSTION

TIME OF FORMER STAGE INJECTION
(TIME OF FORMER STAGE INJECTION SHORTAGE OF #1 CYLINDER)

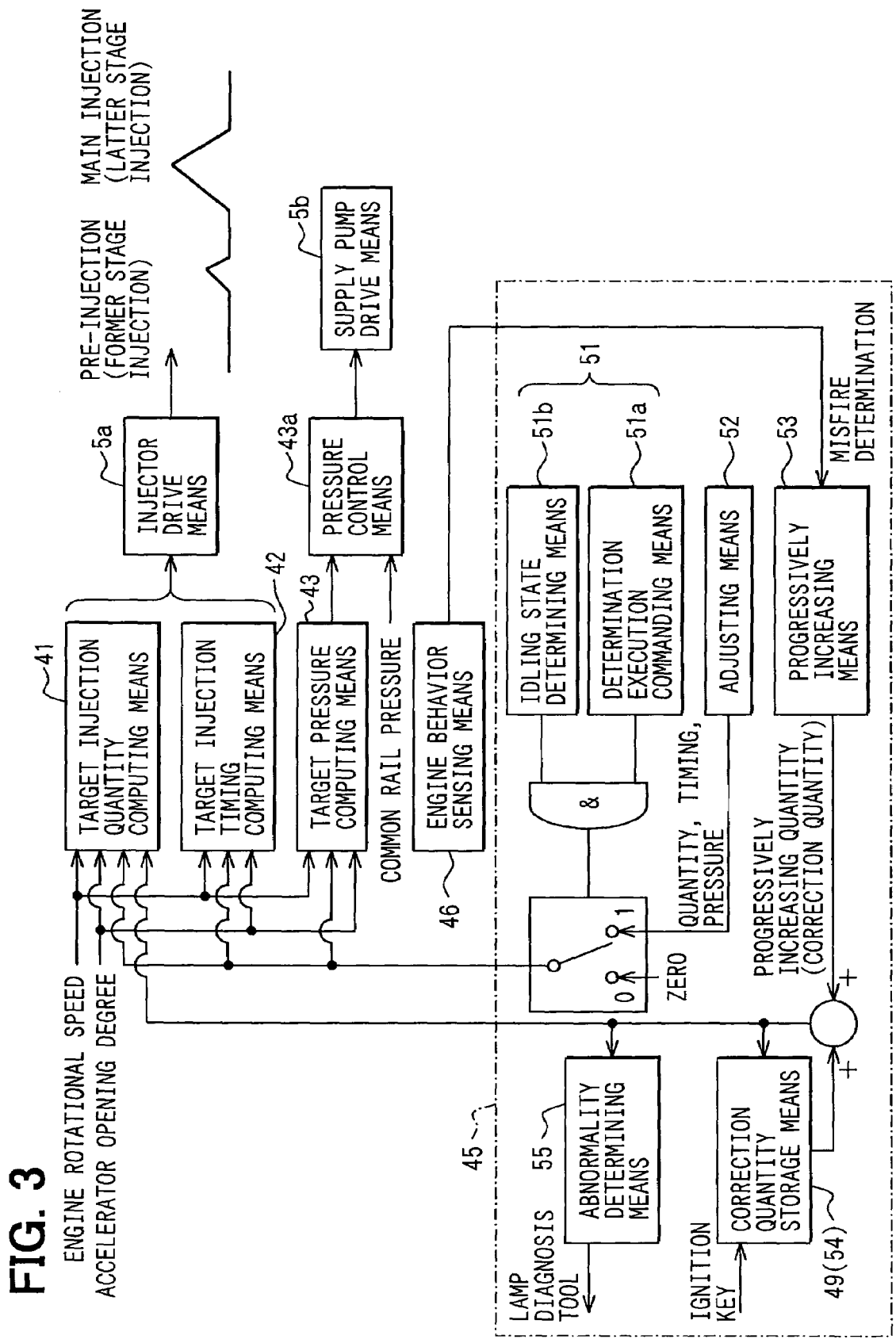

DIESEL ENGINE CONTROL SYSTEM

CROSS REFERENCE TO RELATED APPLICATION

This application is based on and incorporates herein by reference Japanese Patent Application No. 2004-266752 filed on Sep. 14, 2004.

BACKGROUND OF THE INVENTION

1. Field of the Invention

The present invention relates to a diesel engine control system that can perform a specific injection type, in which latter stage injection is ignited by combustion of former stage injection, and the latter stage injection is not ignited upon extinguishment of the former stage injection.

2. Description of Related Art

As one type of multi-stage injection operation, there has been proposed a retarded combustion operation. In the proposed retarded combustion operation, fuel injected into a cylinder by pilot flame generative injection (a former stage injection in an injection pattern of the retarded combustion operation) from an injector is compressed and is ignited, and large heat generative injection (a latter stage injection in the injection pattern of the retarded combustion operation) is carried out at a retarded angle where sole combustion of the large heat generative injection is difficult, so that the large heat generative injection is ignited by the pilot flame combustion caused by the pilot flame generative injection. In this way, the combustion angle of the main combustion (the combustion caused by the large heat generative injection) is retarded, and thereby the undesirable components of the exhaust gas, particularly, NOx is reduced in the retarded combustion operation (low NOx operation).

As discussed above, the main combustion is performed in the respective cylinder, in which the internal volume is increased, and therefore the pressure and the temperature are reduced, so that the NOx in the exhaust gas is reduced (the amount of NOx is increased as the temperature and pressure are increased).

As another technique for reducing the combustion temperature, there is also known an exhaust gas recirculation (EGR).

In the case of executing the retarded combustion operation, it is required to make sure that the pilot flame generative injection is effectively performed, and the fuel of the pilot flame generative injection is effectively combusted.

This is due to the fact that when the combustion of fuel of the pilot flame generative injection is extinguished, fuel injected by the large heat generative injection at the latter stage cannot be ignited. This will likely cause a decrease in the engine torque and/or the engine rotational speed, so that the uncombusted gas may be disadvantageously exhausted from the engine.

The devices of the fuel injection system, such as injectors, may change its output characteristic due to, for example, a change with time (aging), so that the injection quantity of the injector will be possibly changed.

Thus, the combustion of fuel of the pilot flame generative injection could be extinguished due to, for example, the change with time in the devices of the fuel injection system, such as the injectors. This limits use of the retarded combustion operation, in which the above NOx reducing technique is implemented.

Furthermore, in order to more reliably perform the pilot flame combustion, it is possible to increase the pilot flame generative injection quantity (the former stage injection quantity in the injection pattern of the retarded combustion operation). However, this will cause a pressure increase and a temperature increase due to the pilot flame combustion. This will, in turn, cause deterioration of the NOx reducing effect at the time of combusting the large heat generative injection. As a result, it is not desirable to excessively increase the pilot flame generative injection quantity.

SUMMARY OF THE INVENTION

The present invention addresses the above disadvantages. Thus, it is a first objective of the present invention to provide a diesel engine control system that can limit extinguishment of a former stage injection in an injection type, in which the extinguishment of the former stage injection causes non ignition of latter stage injection. It is a second objective of the present invention to provide a diesel engine control system that can reliably perform pilot flame combustion by pilot flame generative injection without requiring an excessively large quantity of the pilot flame generative injection, which results in deterioration of NOx reducing effect in a retarded combustion operation.

To achieve the objectives of the present invention, there is provided a diesel engine control system for an internal combustion engine having a plurality of cylinders, in each of which former stage injection and subsequent latter stage injection are performed in such a manner that combustion of fuel injected by the former stage injection causes ignition of fuel injected by the latter stage injection, and extinguishment of the combustion of the fuel injected by the former stage injection causes non ignition of the fuel injected by the latter stage injection. The diesel engine control system includes a plurality of injectors, a control device and a misfire sensing means. The injectors inject fuel into the plurality of cylinders, respectively, of the internal combustion engine. The control device controls opening and closing of the plurality of injectors based on an operational state of the internal combustion engine. The control device executes the former stage injection and the subsequent latter stage injection in each of the cylinders through a corresponding one of the injectors. The misfire sensing means is for sensing a misfired one of the plurality of cylinders having misfire in the internal combustion engine. The control device includes a former stage injection quantity correcting means for increasingly correcting a former stage injection quantity of the former stage injection in the misfired one of the cylinders until elimination of the misfire when the misfire is sensed by the misfire sensing means.

BRIEF DESCRIPTION OF THE DRAWINGS

The invention, together with additional objectives, features and advantages thereof, will be best understood from the following description, the appended claims and the accompanying drawings in which:

FIG. 3 is a schematic block diagram indicating a computing control operation for computing a pilot flame generative correction quantity (first embodiment);

DETAILED DESCRIPTION OF THE INVENTION

First Embodiment

A first embodiment, in which the present invention is implemented in a common rail type fuel injection system, will be described with reference to FIGS. 1 to 7. A basic structure of the common rail type fuel injection system will be described with reference to FIGS. 6 and 7.

The common rail type fuel injection system is a system, which injects fuel in, for example, a diesel engine 1. The common rail type fuel injection system includes a common rail 2, injectors 3, a supply pump 4, an ECU 5 (standing for an electric control unit and corresponding to a control device).

Figure 6:
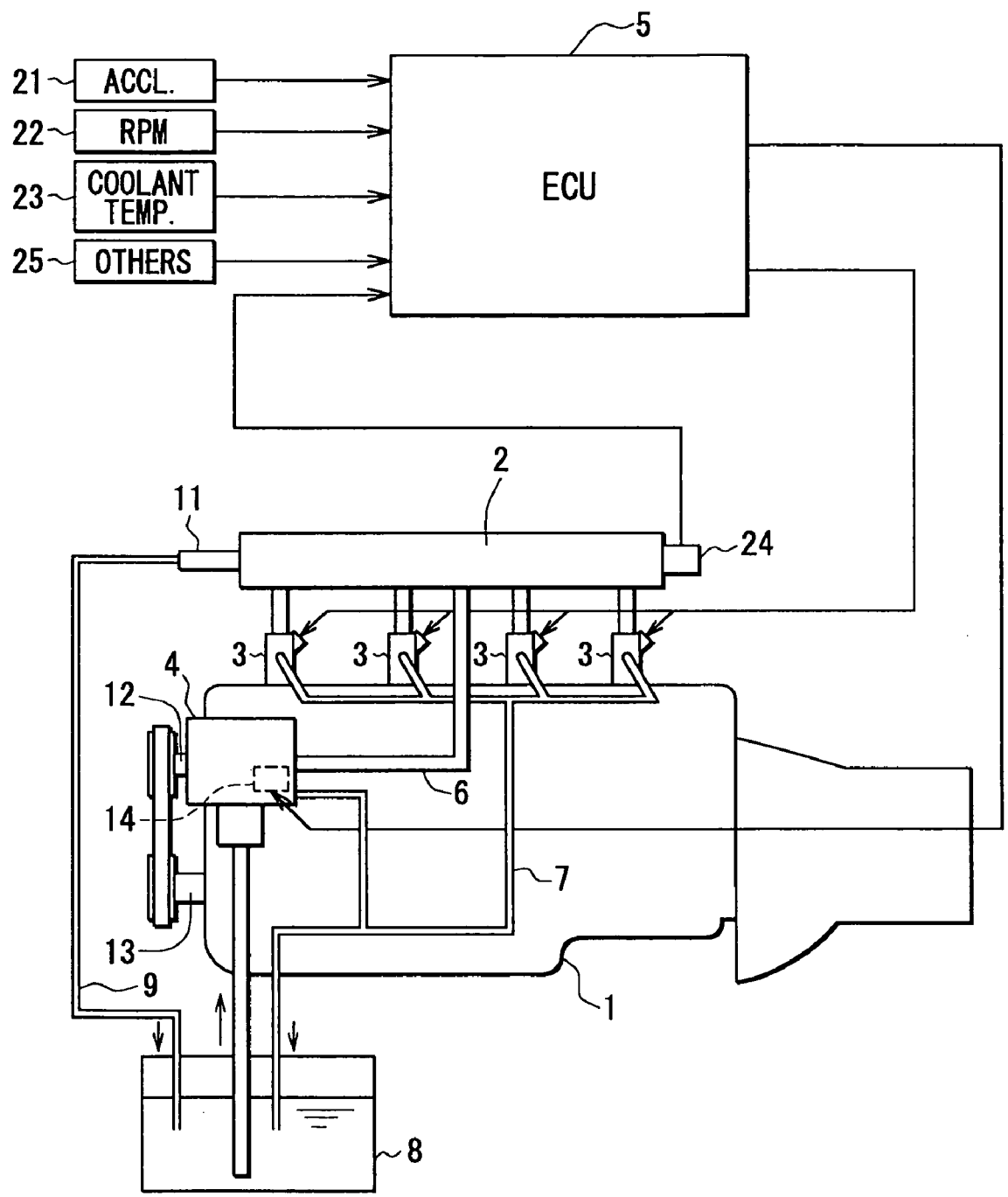
FIG. 6 is a schematic diagram of a common rail type fuel injection system (first embodiment)

The engine 1 has a plurality of cylinders (cylinders #1-#4 in this particular instance), in each of which an intake stroke, a compression stroke, an expansion stroke and an exhaust stroke are continuously performed. In FIG. 6, although a four cylinder engine is depicted as an example of the engine 1, the engine 1 can be any other type of engine, in which the number of cylinders is other than four.

The common rail 2 is a hydraulic accumulator, which accumulates the high pressure fuel that is supplied to the injectors 3. The common rail 2 is connected to a discharge outlet of the supply pump 4, which pumps the high pressure fuel, through a fuel line (a high pressure fuel flow passage) 6 to accumulate the common rail pressure that corresponds to the fuel injection pressure.

Leaked fuel, which is leaked from the injectors 3, is returned to a fuel tank 8 through a leak line (fuel return flow passage) 7.

A pressure limiter 11 is provided in a relief line (a fuel return flow passage) 9, which extends from the common rail 2 to the fuel tank 8. The pressure limiter 11 is a pressure relief valve, which is opened to make the fuel pressure of the common rail 2 equal to or less than a preset limit pressure when the fuel pressure of the common rail 2 exceeds the preset limit pressure.

The injectors 3 are provided to the cylinders, respectively, of the engine 1. Furthermore, the injectors 3 are connected to downstream ends of high pressure fuel lines, respectively, which are branched out from the common rail 2, so that the injectors 3 inject the high pressure fuel accumulated in the common rail 2 to the respective cylinders. Details of the injectors 3 will be described later.

The supply pump 4 is a fuel pump, which pumps the high pressure fuel to the common rail 2. The supply pump 4 includes a feed pump part and a high pressure pump part. The feed pump part suctions the fuel of the fuel tank 8 into the supply pump 4. The high pressure pump part compresses the fuel suctioned by the feed pump at the high pressure and pumps the compressed high pressure fuel to the common rail 2. The feed pump part and the high pressure pump part are driven by a common camshaft 12. As shown in FIG. 6, the camshaft 12 is rotated by, for example, a crankshaft 13 of the engine 1.

Furthermore, the supply pump 4 also includes a pump suction control valve (hereinafter, referred to as "SCV") 14, which adjusts the quantity of the fuel suctioned into the high pressure pump part. When the SCV 14 is adjusted by the ECU 5, the common rail pressure is adjusted.

Figure 7:
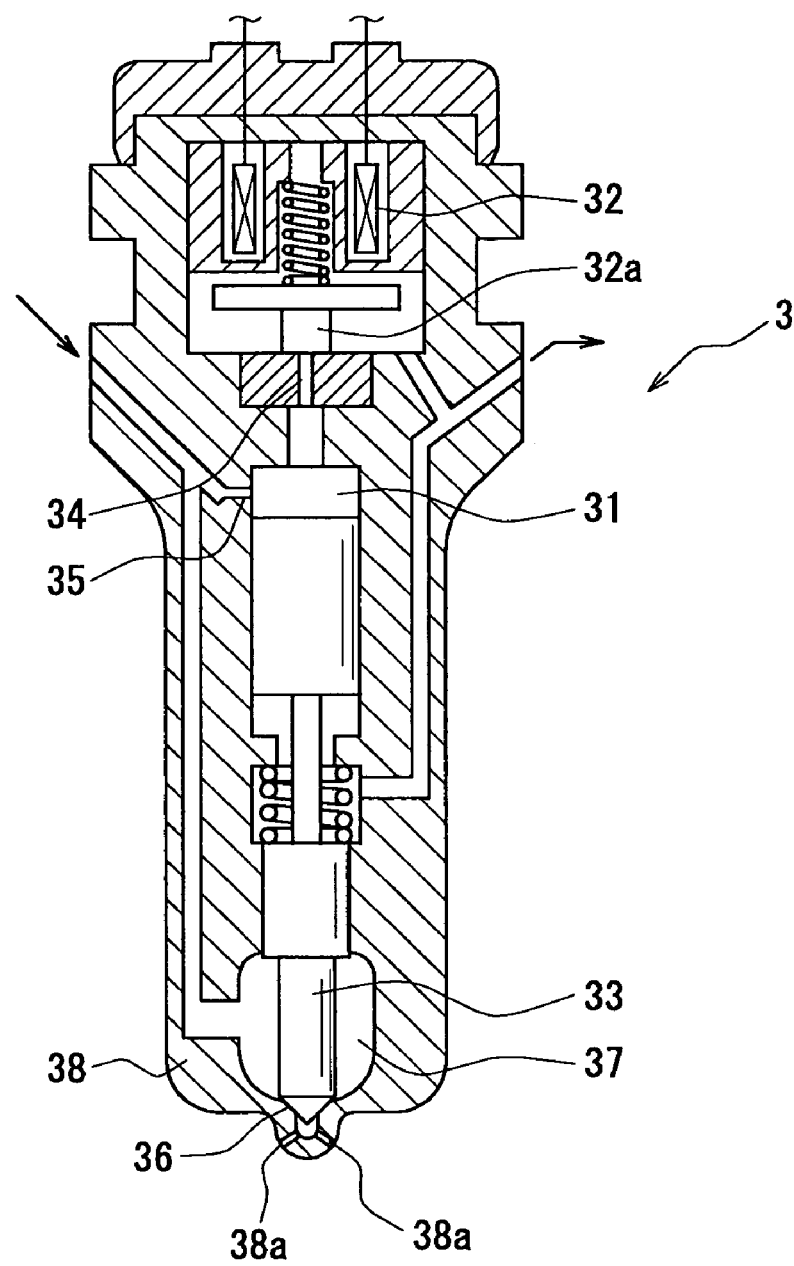
FIG. 7 is a schematic cross sectional view of an injector (first embodiment)

Next, a structure and an operational principal of the individual injector 3 will be described with reference to FIG. 7.

The injector 3 is of a two valve type, in which a solenoid valve 32 is operated to control the pressure in a pressure control chamber (back pressure chamber) 31 and thereby to drive a needle 33. When the ECU 5 outputs an injection command (pulse ON) to the solenoid valve 32, lift-up movement of a valve body 32a of the solenoid valve 32 is initiated, and, at the same time, an output orifice 34 is opened. Thus, the pressure of the pressure control chamber 31, which has been depressurized by an input orifice 35, begins to decrease.

When the pressure of the pressure control chamber 31 decreases to a level equal to or below a valve opening pressure, upward movement of the needle 33 is initiated. When the needle 33 is lifted away from a nozzle seat 36, a nozzle chamber 37 is communicated with fuel injection holes 38a, which are formed in a body 38. Thus, the high pressure fuel, which is supplied to the nozzle chamber 37, is injected from the fuel injection holes 38a. As the upward movement of the needle 33 continues, an injection rate is increased accordingly.

When the injection command, which is outputted from the ECU 5 to the solenoid valve 32, is stopped (pulse OFF), lift-down movement of the valve body 32a of the solenoid valve 32 is initiated. When the valve body 32a of the solenoid valve 32 closes the output orifice 34, the pressure of the pressure control chamber 31 begins to increase. When the pressure of the pressure control chamber 31 increases to a level equal to or greater than a valve closing pressure, downward movement of the needle 33 is initiated. When the needle 33 moves downward and is thus seated against the nozzle seat 36, the communication between the nozzle chamber 37 and the fuel injection holes 38a is disconnected. Therefore, the fuel injection from the fuel injection holes 38a is stopped.

Figure 1:
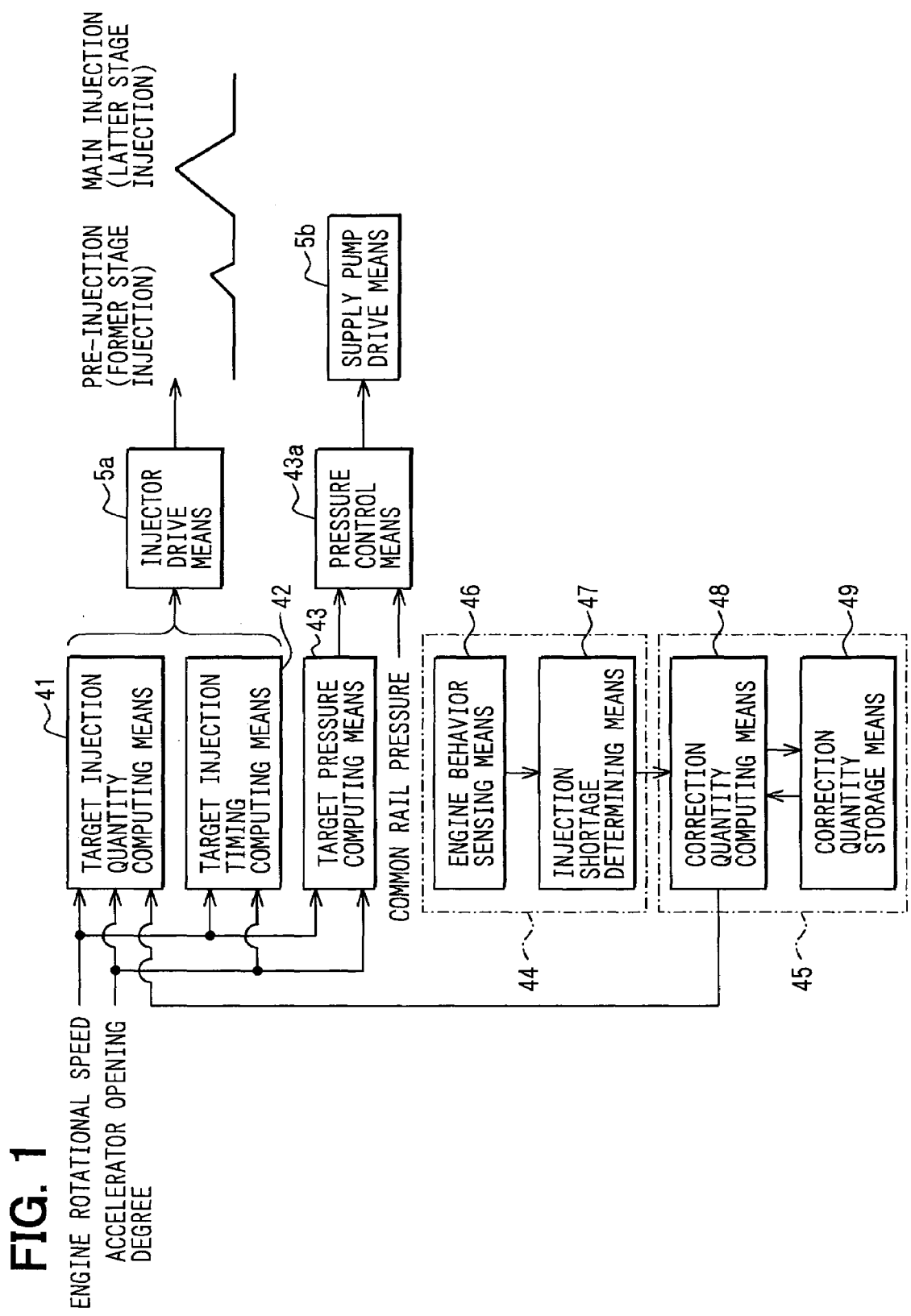
FIG. 1 is a schematic block diagram of a fuel injection control operation (first embodiment)

A basic structure of the ECU 5 will now be described. The ECU 5 has a microcomputer of a known structure, which includes a CPU, a storage device, an input circuit, an output circuit and a power supply circuit. The CPU performs various control processes and computing processes. The storage device (e.g., a memory such as a ROM, a standby RAM, an EEPROM, a RAM) stores various programs and data. In the present embodiment, there is indicated an exemplary case, in which an electric drive unit (EDU) is provided integrally with the ECU 5. However, it should be noted that the EDU may be provided separately from the ECU 5. The EDU has an injector drive means 5a for energizing and driving the injectors 3 and a supply pump drive means 5b for energizing and driving the SCV 14 of the supply pump 4 (see FIG. 1 showing the numerals).

The ECU 5 performs the various computing processes based on signals supplied from sensors (engine parameters: signals corresponding to the operational state of the engine 1 including, for example, an operational state of a vehicle occupant).

With reference to FIG. 6, the sensors for sensing the engine parameters include an accelerator sensor 21 for sensing an accelerator opening degree (or a position of an accelerator pedal), a rotational speed sensor 22 for sensing an engine rotational speed (rpm), a coolant temperature sensor 23 for sensing a coolant temperature of the engine 1, a common rail pressure sensor 24 for sensing the common rail pressure and other sensors 25 for sensing the engine operational state. These sensors 21-25 are connected to the ECU 5.

A main structure of the ECU 5 will be described with reference to a block diagram of FIG. 1.

For each fuel injection, the ECU 5 performs a drive control operation (an injection control operation) of the injectors 3 and a drive control operation (an opening degree control operation) of the SCV 14 of the supply pump 4 based on the programs (e.g., maps, computing equations) stored in the ROM and the engine parameters retrieved into the RAM.

The ECU 5 has an injection pattern determining means, a target injection quantity computing means 41 and a target injection timing computing means 42, which are implemented as the programs stored in the ECU 5 to perform the drive control operation of the injectors 3.

Also, the ECU 5 has a target pressure computing means 43, which is implemented as a program that performs the drive control operation of the SCV 14 (specifically, a program that performs a discharge pressure control operation of the supply pump 4).

The injection pattern determining means (not shown) is a program, which determines a corresponding injection pattern that corresponds to the current operational state. This injection pattern may be of, for example, a single injection type, a normal pilot injection type or a main retarded pilot injection type. The normal pilot injection type is for injecting fuel at a crank angle, which enables sole combustion of fuel injected by large heat generative injection (latter stage injection). The main retarded pilot injection type is for performing a retarded combustion operation, in which fuel is injected at a retarded angle where sole combustion of the fuel of the large heat generative injection is difficult (is normally disabled), and the fuel of the large heat generative injection is ignited by pilot flame combustion that is executed by compression and ignition of fuel injected by pilot flame generative injection (former stage injection).

Hereinafter, for the sake of easy understanding of the present embodiment, only the main retarded pilot injection type for performing the retarded combustion operation will be described.

The main retarded pilot injection type is an exemplary injection type, in which combustion of fuel injected by former stage injection causes ignition of fuel injected by latter stage injection, and extinguishment of the fuel of the former stage injection causes non ignition of the fuel of the latter stage injection. The pilot flame generative injection of the present embodiment corresponds to the former stage injection, and the large heat generative injection of the present embodiment corresponds to the latter stage injection.

The target injection quantity computing means 41 is a control program. This control program obtains a target injection quantity Q corresponding to the current operational state and obtains a commanded injector drive time period, which is required to achieve the target injection quantity Q. Then, this control program causes generation of an injection continuation signal that commands injection of fuel throughout the commanded injector drive time period (specifically, a duration time period of ON of an injection signal).

Specifically, in the case of implementing the main retarded pilot injection type for performing the retarded combustion operation, (1) a pilot flame generative injection quantity (a former stage injection quantity) Qp, which is a quantity of fuel required in pilot flame combustion, is obtained, and (2) a pilot flame generative injector drive time period Qtp, which corresponds to the pilot flame generative injection quantity Qp, is obtained, and (3) a large heat generative injection quantity Qm is obtained by subtracting the pilot flame generative injection quantity Qp from the target injection quantity Q, and (4) a large heat generative injector drive time period Qtm, which corresponds to the large heat generative injection quantity Qm, is obtained.

The target injection timing computing means 42 is a control program. This control program obtains a basic injection timing T for starting ignition of fuel at an ideal ignition timing (an expected target ignition timing) that corresponds to the current operational state. Then, this control program obtains an injection command timing for starting the injection at the basic injection time T. Thereafter, this control program causes generation of an injection start signal (specifically, ON of the injection signal) by the injector drive means 5a at the obtained injection command timing.

Specifically, in the case of implementing the main retarded pilot injection type for performing the retarded combustion operation, (1) a target injection timing Tp of the pilot flame generative injection is obtained, and (2) a pilot flame generative injection command timing Tp' for starting the injection at the target injection timing Tp is obtained, and (3) an interval (an injection stop time period) Tint between the end of the pilot flame generative injection and the beginning of the large heat generative injection is obtained, and (4) the injection start signal (specifically, the ON of the injection signal) is generated by the injector drive means 5a throughout the pilot flame generative injector drive time period Qtp at the pilot flame generative injection command timing Tp', and (5) the injection start signal (specifically, ON of the injection signal) is generated by the injector drive means 5a throughout the large heat generative injector drive time period Qtm at the large heat generative injection command timing that is upon elapse of the interval Tint from the end of the pilot flame generative injection.

Because of this operation, the injection rate of the injector 3 changes in a manner shown at the right side of the top part of FIG. 1, and the main retarded pilot injection type is executed by the pilot flame generative injection (pre-injection) and the large heat generative injection (main injection).

The target pressure computing means 43 is a control program, which obtains a target common rail pressure (a common rail supply pressure) that corresponds to the current operational state. A pressure control means 43a obtains a corresponding SCV opening degree, at which the actual common rail pressure measured by the common rail pressure sensor 24, coincides with the target common rail pressure, which is obtained by the target pressure computing means 43. Then, a signal is provided to the supply pump drive means 5b, so that the supply pump drive means 5b generates a valve opening signal (e.g., a PWM signal) to achieve the SCV opening degree, which is computed by the pressure control means 43a, in the SCV 14.

Next, there will be described a correction control operation for correcting the pilot flame generative injection quantity Qp in the main retarded pilot injection type (hereinafter, referred to as the retarded combustion operation).

In the retarded combustion operation, as discussed above, the injection is carried out at the retarded angle where the sole combustion of the large heat generative injection is difficult (is normally disabled), and fuel of the large heat generative injection is ignited by the pilot flame combustion that is initiated by the compression and ignition of fuel of the pilot flame generative injection, so that the combustion pressure and the combustion temperature are limited, and particularly, the content of the NOx in the exhaust gas is limited (is reduced). Thus, in the retarded combustion operation, the pilot flame generative injection quantity Qp is set to a minimum required quantity, which is required to ignite the fuel of the large heat generative injection, and thereby the combustion pressure and the combustion temperature generated by the pilot flame combustion are limited to small values.

However, it should be noted that there is a remaining possibility of extinguishment of the combustion of the fuel of the pilot flame generative injection, which could be caused by a change of a characteristic of a portion of, for example, the injector 3 used in the common rail type fuel injection system due to a change with time (aging) to cause a change in the injection quantity of fuel from injector 3.

When the combustion of the fuel of the pilot flame generative injection is extinguished, the fuel of the large heat generative injection at the latter stage cannot be ignited. This will likely cause a decrease in the engine torque and/or the engine rotational speed, so that the uncombusted gas may be disadvantageously exhausted from the engine 1.

Thus, in the case of executing the retarded combustion operation, it is required to make sure that the pilot flame generative injection is effectively performed, and injected fuel of the pilot flame generative injection is effectively combusted.

Thus, in the common rail type fuel injection system of the first embodiment, there are provided a misfire sensing means 44 for sensing a misfired cylinder at least in the retarded combustion operation and a pilot flame generative injection quantity correcting means 45 (corresponding to a former stage injection quantity correcting means) for increasingly correcting the pilot flame generative injection quantity Qp of the misfired cylinder until the misfire is eliminated in that cylinder.

The misfire sensing means 44 of the first embodiment will now be described in greater detail. The misfire sensing means 44 includes an engine behavior sensing means 46 (a sensor) for sensing a change in the behavior of the engine 1 and an injection shortage determining means 47 for determining occurrence of misfire and the misfired cylinder based on the change in the behavior of the engine 1.

In the first embodiment, the engine behavior sensing means 46 is the rotational speed sensor 22, which senses the rotational speed of the engine 1 (a rotational speed of the crankshaft 13 of the engine 1), and the injection shortage determining means 47 is a program, which is provided in the ECU 5 and determines the occurrence of the misfire and the misfired cylinder based on a change in the rotational speed sensed by the rotational speed sensor 22.

Figure 2A:
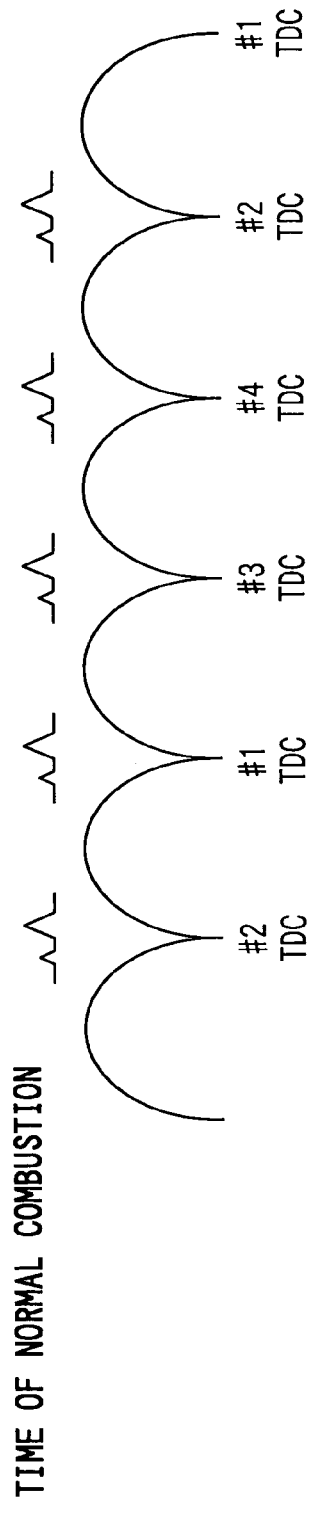
FIG. 2A is a descriptive view schematically indicating a rotational speed change of a crankshaft in a non-misfired state (first embodiment)
Figure 2B:
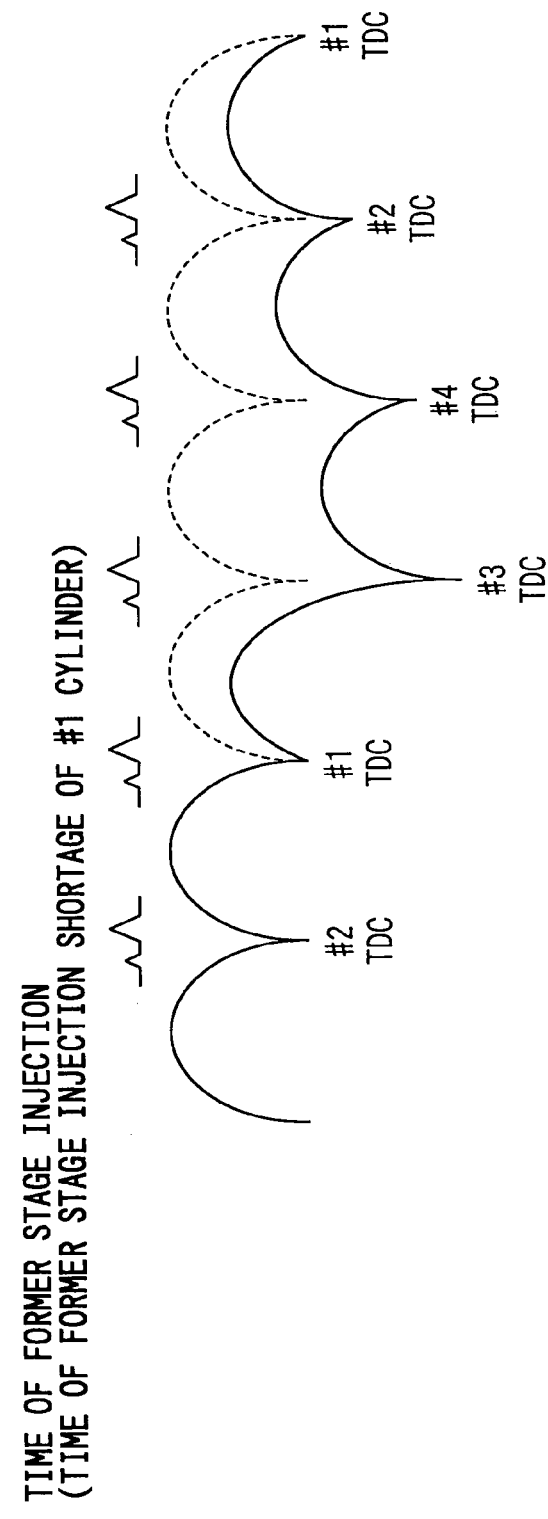
FIG. 2B is descriptive view schematically indicating a rotational speed change of the crankshaft at time of shortage of a former stage injection in #1 cylinder (first embodiment)

Now, a mechanism for determining the occurrence of the misfire and the misfired cylinder by the injection shortage determining means 47 will be described with reference to FIGS. 2A and 2B. Here, it should be noted that the engine 1 of this particular example is the four cylinder engine, and the combustion and expansion of the cylinders #1-#4 occur in the order of the first cylinder #1, the third cylinder #3, the fourth cylinder #4 and the second cylinder #2.

An example of non-misfire will now be described. A solid waveform line of FIG. 2A schematically indicates a rotational speed change (an instantaneous rotational speed change) of the crankshaft 13 in the non-misfired state. In this state, the compression and expansion are repeated in the respective cylinders, and thereby the similar rotational speed change occurs regardless of the cylinders.

An example of occurrence of misfire in the first cylinder #1 will now be described. In the case where shortage of the pilot flame generative injection quantity Qp of the first cylinder #1 occurs due to, for example, the change with time, and therefore fuel of the large heat generative injection cannot be properly combusted, shortage of the generated torque of the first cylinder #1 occurs. Thus, as indicated by a solid waveform line in FIG. 2B, a decrease in the instantaneous rotational speed of the crankshaft 13 becomes large.

Furthermore, in the case where fuel of the large heat generative injection is not properly combusted, a rate of increase in the rotational speed of the crankshaft 13 right after the improper combustion of the large heat generative injection becomes small in comparison to that of the proper combustion of fuel of the large heat generative injection.

The injection shortage determining means 47 is a program. This program senses the occurrence of the misfire when the instantaneous rotational speed of the crankshaft 13 is decreased by a predetermined amount from the average rotational speed of all of the cylinders measured in the case of normal combustion. This program also determines the cylinder, at which the rate of increase in the rotational speed of the crankshaft 13 does not reach a predetermined amount relative to an average rate of increase of all of the cylinders measured in the case of normal combustion, as the misfired cylinder.

Here, it should be noted that the misfired cylinder may be sensed based only on a decrease start point of the instantaneous rotational speed of the crankshaft 13. Also, the cylinder, at which the rate of increase in the rotational speed of the crankshaft 13 is relatively small, may be determined as the misfired cylinder.

The pilot flame generative injection quantity correcting means 45 will now be described in greater detail. As discussed above, the pilot flame generative injection quantity correcting means 45 is for increasingly correcting the pilot flame generative injection quantity Qp of the misfired cylinder until the misfire is eliminated at the time of sensing the misfire by the misfire sensing means 44, and the pilot flame generative injection quantity correcting means 45 thereafter corrects each pilot flame generative injection quantity Qp based on a pilot flame generative correction quantity (former stage correction quantity) Qpi, at which the misfire is eliminated. As shown in FIG. 1, the pilot flame generative injection quantity correcting means 45 includes a correction quantity computing means 48 and a correction quantity storage means 49. The correction quantity computing means 48 is for computing the pilot flame generative correction quantity Qpi to be added to a basic pilot flame generative injection quantity Qpa. The correction quantity storage means 49 is for storing the pilot flame generative correction quantity Qpi in the storage device, such as a nonvolatile memory, and is for reflecting the stored pilot flame generative correction quantity Qpi in each basic pilot flame generative injection quantity Qpa in the following retarded combustion operations.

A specific structure of the pilot flame generative injection quantity correcting means 45 will be described with reference to FIG. 3.

The pilot flame generative injection quantity correcting means 45 includes a learning execution determining means 51, an operational state adjusting means 52, a progressively increasing means 53, the above-described correction quantity storage means 49, a correction reflecting means 54 and an abnormality determining means 55.

The learning execution determining means 51 will now be described in greater detail. The learning execution determining means 51 is a program and includes a determination execution commanding means 51*a* and an idling state determining means 51*b*. The determination execution commanding means 51*a* is for determining whether a travel distance of the vehicle has become equal to or greater than a predetermined distance interval (e.g., every 1000 km). The idling state determining means 51*b* is for determining whether the engine 1 is in an idling state, at which warming-up of the engine 1 has been completed. When an operational period of the engine 1 has become equal to or greater than the predetermined interval, and the operational state of the engine 1 is stabilized, the leaning execution determining means 51 determines that a learning condition is satisfied.

The end of the warming-up of the engine 1 is determined when the coolant temperature of the engine 1 becomes equal to or greater than a predetermined temperature. The idling state is determined upon satisfaction of at least one of the following conditions: the accelerator opening degree is zero; and the engine rotational speed is a predetermined idling rotational speed.

As discussed above, the learning operation (the misfire inducing state, at which the misfire is prone to occur and which is implemented by an operational state adjusting means 52 described below) is performed after the travel distance of the vehicle becomes equal to or greater than the predetermined distance interval. Thus, the frequency of the learning operation, at which the operation of the engine 1 is unstable, is reduced.

Furthermore, the learning operation is performed in the idling state of the engine after the warming-up. Thus, an abrupt change in the combustion state caused by an accelerator operation will not be incorrectly interpreted as the misfire, so that the change in the engine rotational speed caused by a change in the vehicle driving state can be easily distinguished from the misfire. As a result, the occurrence of the misfire can be effectively sensed in the engine operational state, at which the misfire is prone to occur. That is, the misfire sensing accuracy can be increased.

The operational state adjusting means 52 will now be described in greater detail. The operational state adjusting means 52 is a program, which adjusts the operational state of the engine 1 in the retarded combustion operation to the misfire inducing state, at which the misfire is prone to occur due to the shortage of the pilot flame generative injection quantity Qp, when the learning execution determining means 51 determines that the learning condition is satisfied.

As described above, the misfire inducing operational state, at which the misfire is prone to occur due to the shortage of the pilot flame generative injection quantity Qp, is intentionally created, so that the cylinder, at which the misfire is prone to occur, can be sensed. Specifically, at the time of learning operation, the cylinder, at which the misfire is prone to occur, is identified, and the pilot flame generative injection quantity Qp of that particular cylinder is corrected.

Thus, it is possible to obviate the occurrence of the misfire during the normal retarded combustion operation, which is other than the learning operation.

The progressively increasing means 53 will now be described in greater detail. The progressively increasing means 53 is a program, which progressively increases the pilot flame generative injection quantity Qp of the misfired cylinder when the misfire sensing means 44 (the engine behavior sensing means 46 and the injection shortage determining means 47) senses the misfire of the misfired cylinder.

Figure 4:
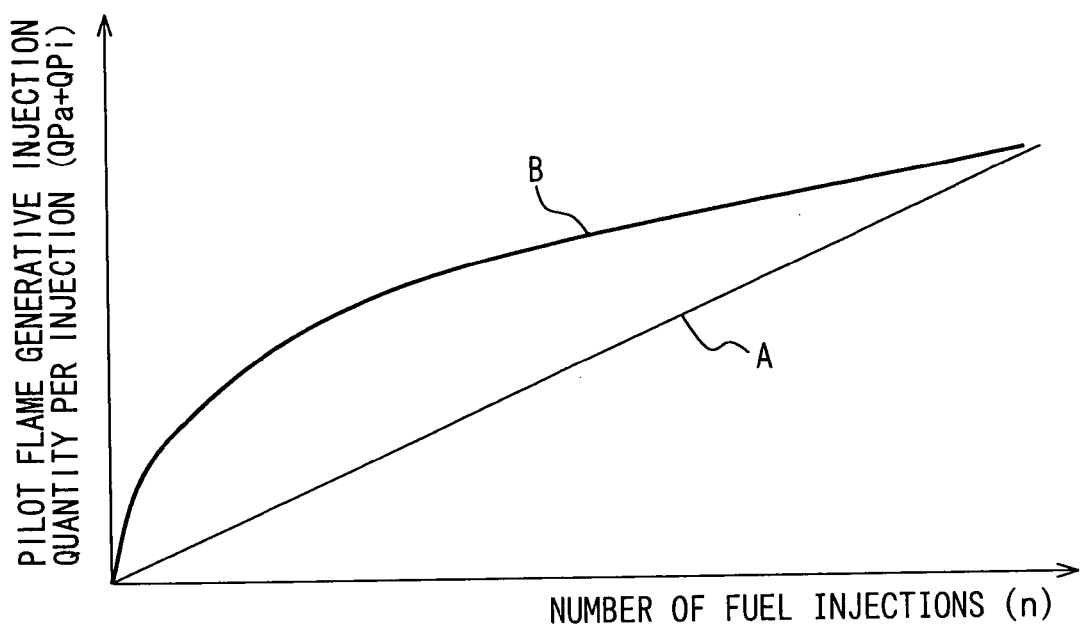
FIG. 4 is a graph showing increasing patterns of the pilot flame generative injection quantity (first embodiment)

In general, "the progressively increasing" means an increasing pattern indicated by a solid line A in FIG. 4. When the pilot flame generative injection quantity Qp is corrected to follow the increasing pattern indicated by the solid line A, a time period between the misfire and the ignition is lengthened. During this time period, the operational state of the engine 1 becomes unstable due to the occurrence of the misfire, possibly causing unpleasant feeling of the vehicle occupant.

In view of this, the progressively increasing means 53 of the present embodiment is provided with an initially rapidly increasing pattern. In the initially rapidly increasing pattern, a relatively large increase rate of the pilot flame generative correction quantity Qpi exists at the initial small injection numbers (the small numbers of fuel injections), and then the increase rate of the pilot flame generative correction quantity Qpi is reduced when the injection number (the number of fuel injections) is increased during the continuation of the misfired state. That is, when the injection number is increased during the continuation of the misfired state, the pilot flame generative injection quantity Qp (the basic pilot flame generative injection quantity Qpa+the pilot flame generative correction quantity Qpi) is increased to follow an increasing curve indicated by a solid line B in FIG. 4.

As described above, by implementing the large increase rate of the pilot flame generative correction quantity Qpi at the initial small injection numbers, the misfire can be terminated, i.e., eliminated within a short period of time.

Furthermore, by reducing the increase rate of the pilot flame generative correction quantity Qpi at the larger injection numbers, the correction accuracy of the pilot flame generative correction quantity Qpi, at which the misfire is eliminated, can be increased. In this way, it is possible to limit the pilot flame generative injection quantity Qp to reach an undesirably high level, at which the NOx reducing effect of the pilot flame is lost.

In the present embodiment, there is described the case where the pilot flame generative injection quantity Qp, which is used as the reference for determining the injector drive time period, is increasingly corrected. However, as will be described below, the actual pilot flame generative injection quantity Qp can be increased by increasing the common rail pressure. Thus, the target common rail pressure may be increasingly corrected.

The correction quantity storage means 49 will now be described in greater detail. The correction quantity storage means 49 is a program, which stores the pilot flame generative correction quantity Qpi (a learning value), at which the misfire is eliminated through the correction of the pilot flame generative injection quantity Qp carried out by the progressively increasing means 53.

The correction quantity storage means 49 of the present embodiment temporarily stores the pilot flame generative correction quantity Qpi, at which the misfire is eliminated, in the RAM, which is the storage device. Thereafter, when an ignition switch is turned off, the correction quantity storage means 49 retrieves the pilot flame generative correction quantity Qpi from the RAM and stores the retrieved pilot flame generative correction quantity Qpi in the nonvolatile memory, which is the storage device.

The correction reflecting means 54 will now be described in greater detail. The correction reflecting means 54 is a program that reflects the pilot flame generative correction quantity Qpi, which has been stored by the correction quantity storage means 49, at least into the pilot flame generative injection quantity Qp in the retarded combustion operation. In FIG. 3, it is assumed that the correction reflecting means 54 is included in the correction quantity storage means 49.

When the ignition switch is turned on, the correction reflecting means 54 of the present embodiment retrieves the pilot flame generative correction quantity Qpi stored in the nonvolatile memory, which is the storage device. Then, the correction reflecting means 54 reflects the retrieved pilot flame generative correction quantity Qpi, which now serves as a correction quantity initial value, into the pilot flame generative injection quantity Qp in the retarded combustion operation.

Now, a specific exemplary case of increasingly correcting the pilot flame generative injection quantity Qp by the pilot flame generative correction quantity Qpi will be described.

Figure 5A:
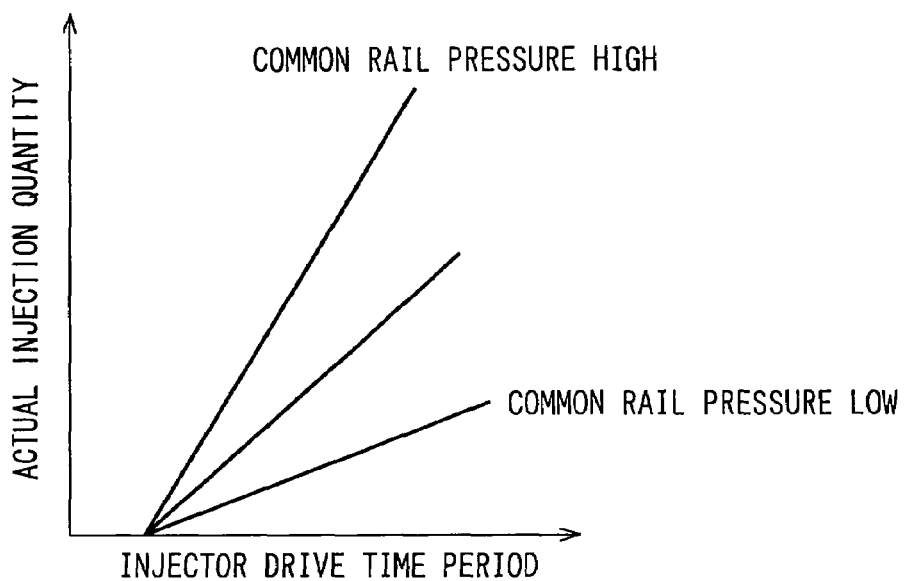
FIG. 5A is a graph indicating a relationship between an injector drive time period and an injection quantity in view of common rail pressures (first embodiment)
Figure 5B:
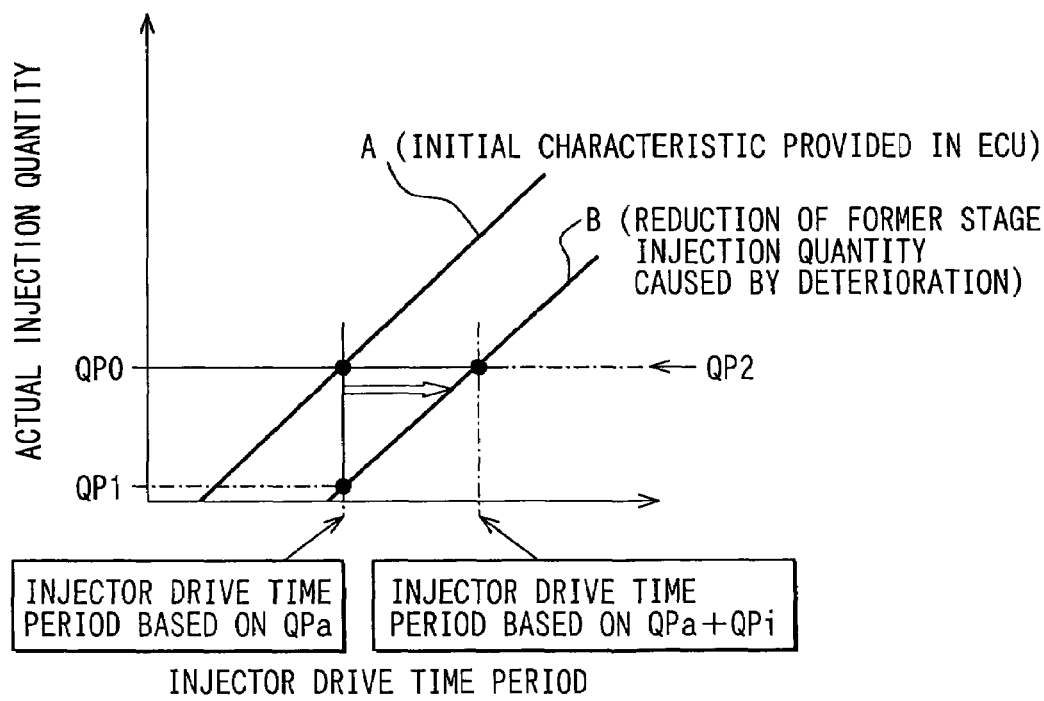
FIG. 5B is a graph indicating a relationship between the injector drive time period and the injection quantity (first embodiment)

When the relationship (Tq-Q characteristic) between the injector drive time period and the injection quantity coincides with a solid line A of FIG. 5B, the actual pilot flame generative injection quantity can be coincided with a target pilot flame generative injection quantity Qp0 by determining the injector drive time period based on the basic pilot flame generative injection quantity Qpa.

In a case where the relationship (Tq-Q characteristic) between the injector drive time period and the injection quantity is shifted to the one that coincides with a solid line B of FIG. 5B due to the change with time in, for example, the injector 3, the actual pilot flame generative injection quantity Qp1 becomes extremely small relative to the target pilot flame generative injection quantity Qp0 to cause misfire of fuel of the large heat generative injection when the injector drive time period is determined based on the basic pilot flame generative injection quantity Qpa.

Thus, in the present embodiment, the pilot flame generative injection quantity Qp (a computed value) is increased by adding the pilot flame generative correction quantity Qpi to the basic pilot flame generative injection quantity Qpa. Then, the injector 3 is controlled with the injector drive time period (a lengthened drive time period), which is determined based on the above corrected pilot flame generative injection quantity Qp, so that the actual pilot flame generative injection quantity Qp2 is coincided with the target pilot flame generative injection quantity Qp0.

Here, as shown in FIG. 5A, the injection quantity, which is injected from the injector 3, is increased (1) as the injector drive time period (an energizing time period of the injector) is increased and (2) as the common rail pressure (a supply pressure of fuel injected into the injector) is increased.

In the present embodiment, although there is described the exemplary case where the pilot flame generative injection quantity Qp is increased by adding the pilot flame generative correction quantity Qpi to the basic pilot flame generative injection quantity Qpa, the pilot flame generative injection quantity Qp may be corrected by increasingly correcting the target common rail pressure P through the target pressure computing means 43.

In the present embodiment, the description is focused on the correction of the pilot flame generative injection quantity Qp in the retarded combustion operation. However, in the case where the pilot flame generative injection quantity Qp is decreased due to the change with time in the injector 3, the other injection quantity, such as the large heat generative injection quantity Qm, may possibly be reduced. In view of this point, the other injection quantity, such as the large heat generative injection quantity Qm, may be corrected based on the pilot flame generative correction quantity Qpi that is measured upon elimination of the misfire.

The abnormality determining means 55 will now be described in greater detail. The abnormality determining means 55 is a program, which determines an occurrence of abnormality when an increase in the pilot flame generative correction quantity Qpi exceeds a preset threshold value.

Specifically, when the increase in the pilot flame generative correction quantity Qpi exceeds the threshold value, the occurrence of the abnormality is notified to the vehicle occupant by a visually displaying means (not shown), such as a lamp, and a failure determination signal is outputted to a failure processing system (an diagnosis tool). The failure determination signal indicates the occurrence of the abnormality in the cylinder 3, in which the increase in the pilot flame generative correction quantity Qpi has exceeded the threshold value.

The above operation of the abnormality determining means 55 can limit a degree of deterioration of the injector 3. Thus, the deterioration of the engine performance can be limited in advance, and the failure processing (maintenance) can be easily carried out.

Advantages of the first embodiment will now be described. In the common rail type fuel injection system of the present embodiment, as described above, (a) when the travel distance of the vehicle (the operating time period of the engine 1) becomes equal to or greater than the predetermined interval, and the engine 1 is in the idling state (the satisfaction of the learning condition where the operational state of the engine 1 is stabilized), (b) the operational state of the engine 1 is adjusted to the misfire inducing state, at which the misfire is prone to occur due to the shortage of the pilot flame generative injection quantity Qp, in the retarded combustion operation. Then, (c) when the misfire is sensed by the misfire sensing means 44, the pilot flame generative injection quantity Qp of the misfired cylinder is progressively increased, and (d) the pilot flame generative correction quantity Qpi, which is measured upon elimination of the misfire, is stored. Thereafter, (e) the stored pilot flame generative correction quantity Qpi is reflected into the other pilot flame generative injection quantity (the following pilot flame generative injection quantities) Qp during the operation of the engine 1 (at least during the retarded combustion operation).

As described above, when the travel distance of the vehicle (one example of the operational period) becomes equal to or greater than the predetermined interval, the learning operation (the misfire inducing state, at which the misfire is prone to occur due to the shortage of the pilot flame generative injection quantity Qp) is implemented, so that the frequency of the learning operation is reduced. That is, the frequency of the learning operation, at which the operational state of the engine 1 is unstable, can be reduced, and the frequency of occurrence of the unpleasant feeling in the vehicle occupant caused by the learning operation can be reduced.

Furthermore, the learning operation is carried out in the idling state, at which the operational state of the engine 1 is stabilized, so that the external disturbance is limited, and thereby the computing accuracy of the pilot flame generative correction quantity Qpi can be increased. In this way, it is possible to effectively limit the pilot flame generative injection quantity Qp to reach the undesirably high level, at which the NOx reducing effect of the pilot flame is lost or deteriorated.

Furthermore, in the operation of the engine 1, at least during the retarded combustion operation, the pilot flame generative injection quantity Qp is corrected using the pilot flame generative correction quantity Qpi, which is obtained with the high accuracy. Thus, the retarded combustion operation can be reliably carried out for a long period of time. That is, the amount of NOx in the exhaust gas can be limited by the retarded combustion operation for a long period of time.

Second Embodiment

In each of the following embodiments, the misfire sensing means 44 (the engine behavior sensing means 46 and the injection shortage determining means 47) is different from that of the first embodiment. Thus, in each of the following embodiments, the misfire sensing means 44 will be described. Furthermore, in each of the following embodiments, functional components, which are similar to those of the first embodiment, are indicated by the same numerals.

The misfire sensing means 44 of a second embodiment senses the misfire of the engine 1 based on a change in the exhaust gas temperature of the engine 1. Here, an exhaust gas temperature sensor (not shown), which is connected to an exhaust pipe of the engine 1, is used as the engine behavior sensing means 46.

When the shortage of the pilot flame generative injection occurs, fuel of the large heat generative injection is not combusted, resulting into the misfire. In such a case, the exhaust gas temperature at the time of occurrence of the misfire is reduced in comparison to the temperature of the other normal cylinders. The injection shortage determining means 47 of the second embodiment is a program, which senses such a decrease of the exhaust gas temperature to determine the misfired cylinder.

The technique for determining the misfired cylinder based on the exhaust gas temperature requires a high response of the exhaust gas temperature sensor. Particularly, in a case where a single exhaust gas temperature sensor is used to monitor a change in the exhaust gas temperature in all of the cylinders, the exhaust gas temperature sensor needs to have a high response for sensing the temperature. Furthermore, in a case where exhaust gas temperature sensors are provided to the cylinders, respectively, it is possible to reduce the required response of each exhaust gas temperature sensor. However, this causes an increase in the costs. Furthermore, information of the engine rotational speed is required in all vehicles, so that the every vehicle has the rotational speed sensor 22. However, when the above technique is applied to the vehicle having no exhaust gas temperature sensor, it disadvantageously causes an increase in the costs.

Despite the above disadvantage, when the misfired cylinder is identified based on the exhaust gas temperature, a computing load of the ECU 5 can be reduced in comparison to the case where the misfired cylinder is identified based on the engine rotational speed. Furthermore, the reduction in the computing load of the ECU 5 allows an enlargement of the operational range, in which the learning operation (the operation for diagnosing the misfire and for correcting the pilot flame generative injection quantity Qp) can be performed.

Third Embodiment

The misfire sensing means 44 of a third embodiment senses the misfire of the engine 1 based on a change in an air-to-fuel ratio in the exhaust gas of the engine 1. Here, an air-to-fuel ratio sensor (a lambda sensor, such as an oxygen concentration sensor, not diagramatically depicted), which is connected to the exhaust pipe of the engine 1, is used as the engine behavior sensing means 46.

When the shortage (fuel shortage) of the pilot flame generative injection occurs, fuel of the large heat generative injection is not combusted, resulting into the misfire. In such a case, the oxygen concentration (A/F) at the time of occurrence of the misfire is increased in comparison to the oxygen concentration (A/F) of the other normal cylinders. The injection shortage determining means 47 of the third embodiment is a program, which senses such an increase of the oxygen concentration (A/F) to determine the misfired cylinder.

The technique for determining the misfired cylinder based on the air-to-fuel ratio of the exhaust gas requires a high response of the air-to-fuel ratio sensor. Particularly, in a case where a single air-to-fuel ratio sensor is used to monitor a change in the air-to-fuel ratio in all of the cylinders, the air-to-fuel ratio sensor needs to have a high response for sensing the air-to-fuel ratio. Furthermore, in a case where air-to-fuel ratio sensors are provided to the cylinders, respectively, it is possible to reduce the required response of each air-to-fuel ratio sensor. However, this causes an increase in the costs. Furthermore, information of the engine rotational speed is required in all vehicles, so that the every vehicle has the rotational speed sensor 22. However, when the above technique is applied to the vehicle having no air-to-fuel ratio sensor, it disadvantageously causes an increase in the costs.

Despite the above disadvantage, when the misfired cylinder is identified based on the air-to-fuel ratio, a computing load of the ECU 5 can be reduced in comparison to the case where the misfired cylinder is identified based on the engine rotational speed. Furthermore, the reduction in the computing load of the ECU 5 allows an enlargement of the operational range, in which the learning operation (the operation for diagnosing the misfire and for correcting the pilot flame generative injection quantity Qp) can be performed.

Fourth Embodiment

Figure 8:
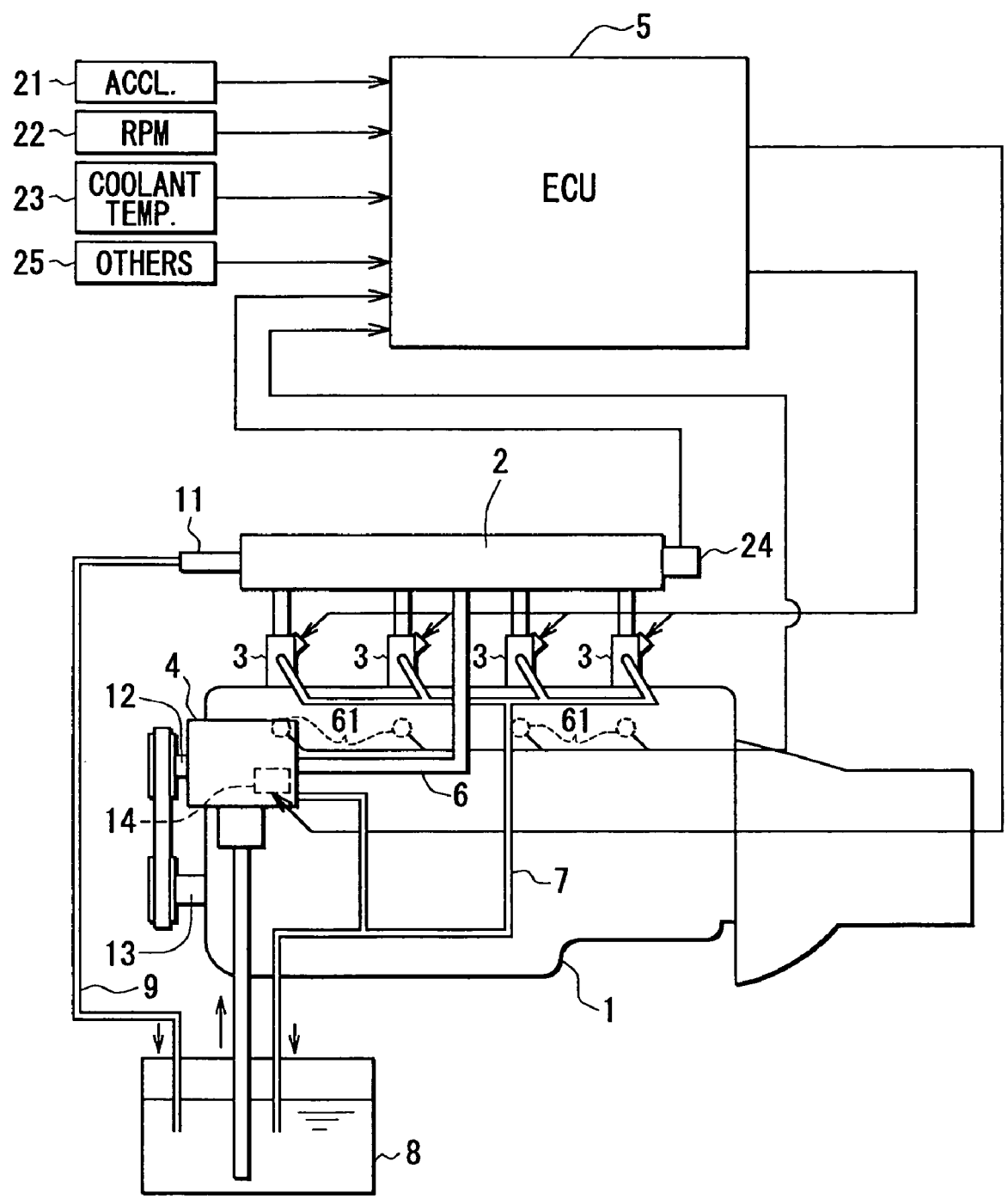
FIG. 8 is a schematic diagram of a common rail type fuel injection system (fourth embodiment)

The misfire sensing means 44 of a fourth embodiment senses the misfire of the engine 1 based on a change in a cylinder pressure, which is a pressure in the cylinder of the engine 1. Here, as shown in FIG. 8, cylinder pressure sensors 61, each of which senses the cylinder pressure of the corresponding cylinder of the engine 1, are used as the engine behavior sensing means 46.

Figure 9:
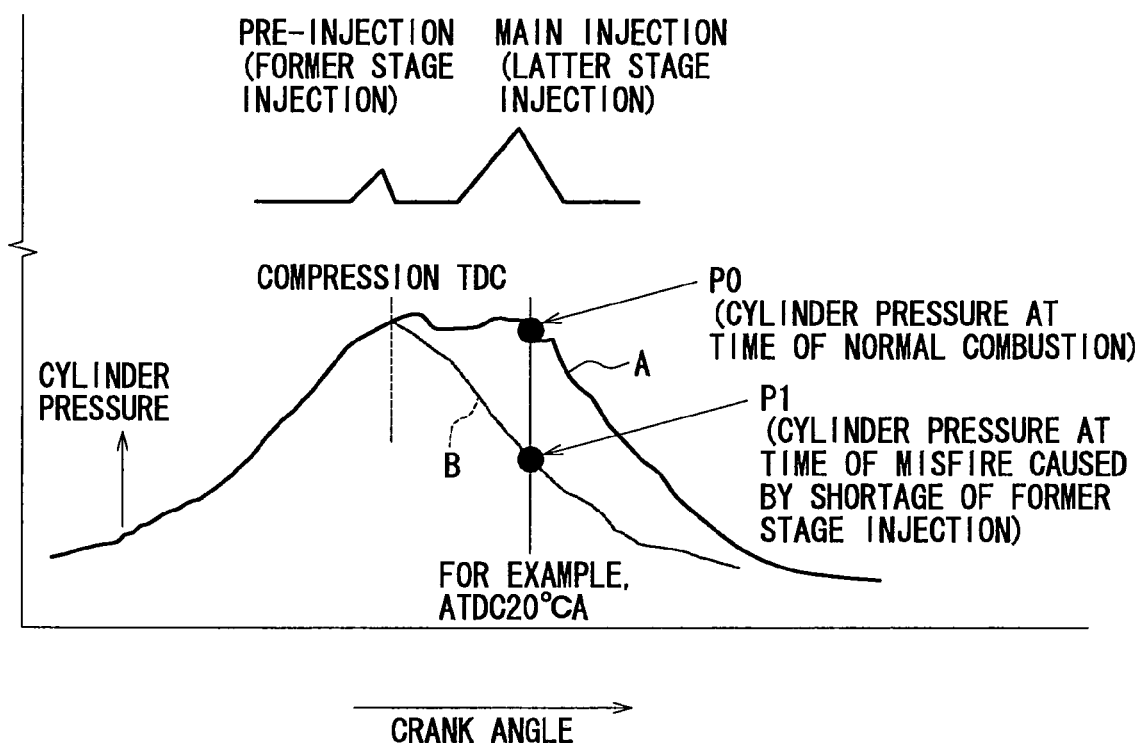
FIG. 9 is a time chart showing a relationship between a crank angle and a cylinder pressure (fourth embodiment)

When fuel of the pilot flame generative injection is normally injected, and subsequently fuel of the large heat generative injection is combusted, the cylinder pressure P0 of the normal combustion is obtained through the main combustion at a predetermined crank angle (e.g., ATDC 20 degree CA), as indicated by a solid line A in FIG. 9.

In contrast, when the shortage (fuel shortage) of the pilot flame generative injection occurs, fuel of the large heat generative injection is not combusted, resulting into the misfire. In such a case, as indicated by a dotted line B in FIG. 9, the cylinder pressure P1, which is lower than the cylinder pressure P0 of the normal combustion, is observed at the predetermined crank angle (e.g., ATDC 20 degree CA).

The injection shortage determining means 47 of the fourth embodiment is a program, which senses the cylinder pressure of the subject cylinder at the predetermined crank angle (e.g., ATDC 20 degree CA) and determines the subject cylinder as the misfired cylinder when the cylinder pressure of the subject cylinder is lower than the cylinder pressure P0 of the normal combustion by an amount that is equal to or greater than a predetermined threshold range.

By using the cylinder pressure sensor 61, information of the cylinder pressure at the predetermined crank angle can be obtained, and the presence of the combustion of fuel of the large heat generative injection can be easily and reliably sensed.

Furthermore, the above technique, which uses the cylinder pressure sensors 61, requires provision of the cylinder pressure sensors 61 to the cylinders, respectively. Thus, it causes an increase in the costs when such a technique is applied to the vehicle having no cylinder pressure sensor 61.

However, when the misfired cylinder is identified through the use of the cylinder pressure sensor 61, a computing load of the ECU 5 can be reduced in comparison to the case where the misfired cylinder is identified based on the engine rotational speed. Furthermore, the reduction in the computing load of the ECU 5 allows an enlargement of the operational range, in which the learning operation (the operation for diagnosing the misfire and for correcting the pilot flame generative injection quantity Qp) can be performed.

Fifth Embodiment

Figure 10:
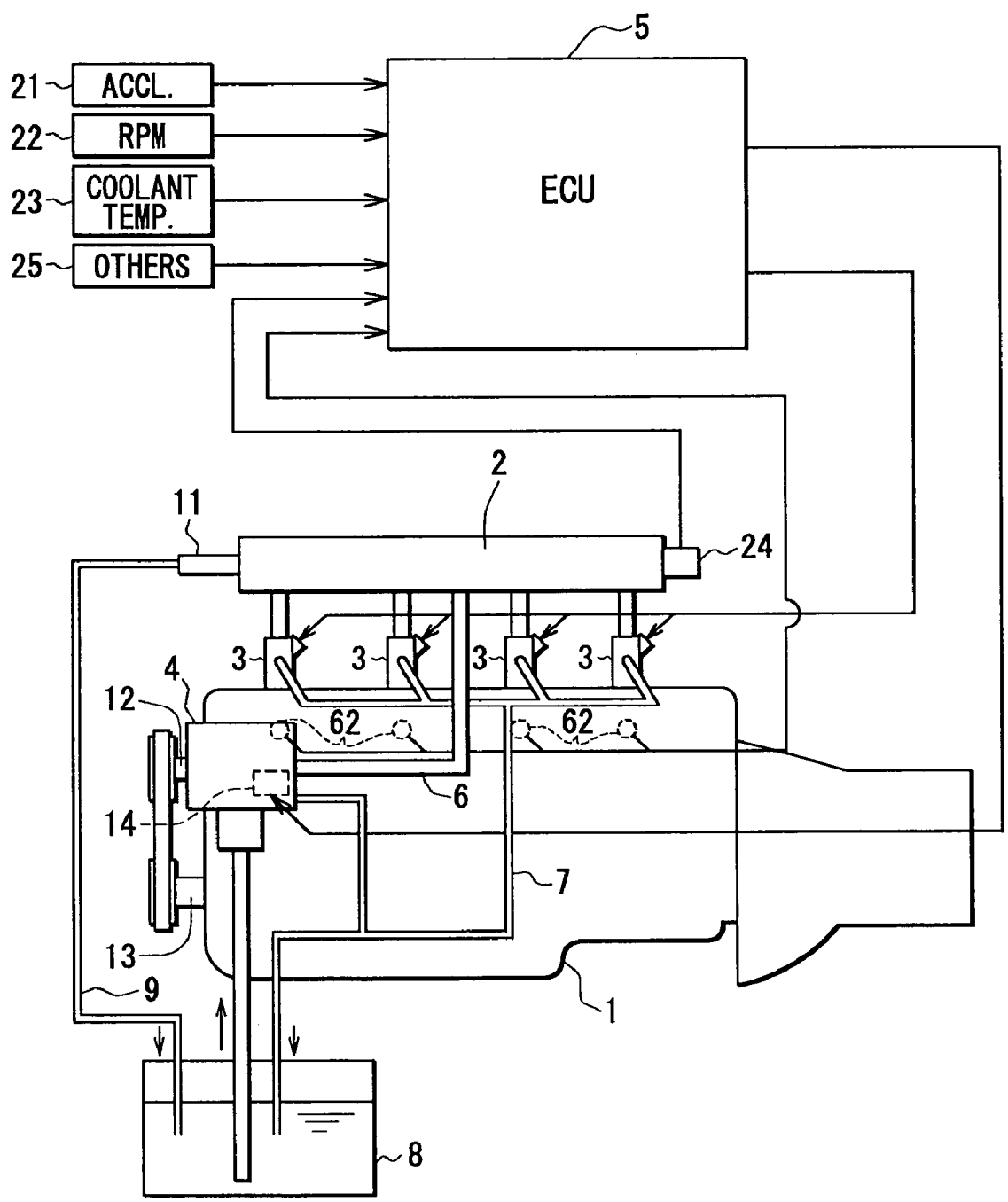
FIG. 10 is a schematic diagram of a common rail type fuel injection system (fifth embodiment)

A misfire sensing means 44 of a fifth embodiment senses the misfire of the engine 1 based on a change in an ion current value in the cylinder of the engine 1. As shown in FIG. 10, ion current sensors 62, each of which measures the ion current value in a combustion chamber of the corresponding cylinder of the engine 1, are used as the engine behavior sensing means 46. Each ion current sensor 62 is implemented in, for example, a glow plug received in the combustion chamber by providing an ion current sensing function in the glow plug. When ions are generated in the combustion chamber, an ion current flows due to the presence of the ions. When the ion current flows, a signal, which corresponds to the generated electric current, is outputted from the ion current sensor 62 to the ECU 5.

When fuel of the pilot flame generative injection is normally injected, and subsequently fuel of the large heat generative injection is combusted, an ion current value of the normal combustion is obtained through the main combustion at a predetermined crank angle (e.g., ATDC 20 degree CA).

In contrast, when the shortage (fuel shortage) of the pilot flame generative injection occurs, fuel of the large heat generative injection is not combusted, resulting into the misfire. In such a case, an ion current value, which is lower than the ion current value of the normal combustion, is observed at the predetermined crank angle (e.g., ATDC 20 degree CA).

The injection shortage determining means 47 of the fifth embodiment is a program, which senses the ion current value of the subject cylinder at the predetermined crank angle (e.g., ATDC 20 degree CA) and determines the subject cylinder as the misfired cylinder when the ion current value of the subject cylinder is lower than the ion current value of the normal combustion by an amount that is equal to or greater than a predetermined threshold range.

By using the ion current sensor 62, information of the cylinder pressure at the predetermined crank angle can be obtained, and the presence of the combustion of fuel of the large heat generative injection can be easily and reliably sensed.

Furthermore, the above technique, which uses the ion current sensors 62, requires provision of the ion current sensors 62 to the cylinders, respectively. Thus, it causes an increase in the costs when such a technique is applied to the vehicle having no ion current sensor 62.

However, when the misfired cylinder is identified through the use of the ion current sensor 62, a computing load of the ECU 5 can be reduced in comparison to the case where the misfired cylinder is identified based on the engine rotational speed. Furthermore, the reduction in the computing load of the ECU 5 allows an enlargement of the operational range, in which the learning operation (the operation for diagnosing the misfire and for correcting the pilot flame generative injection quantity Qp) can be performed.

Sixth Embodiment

Figure 11:
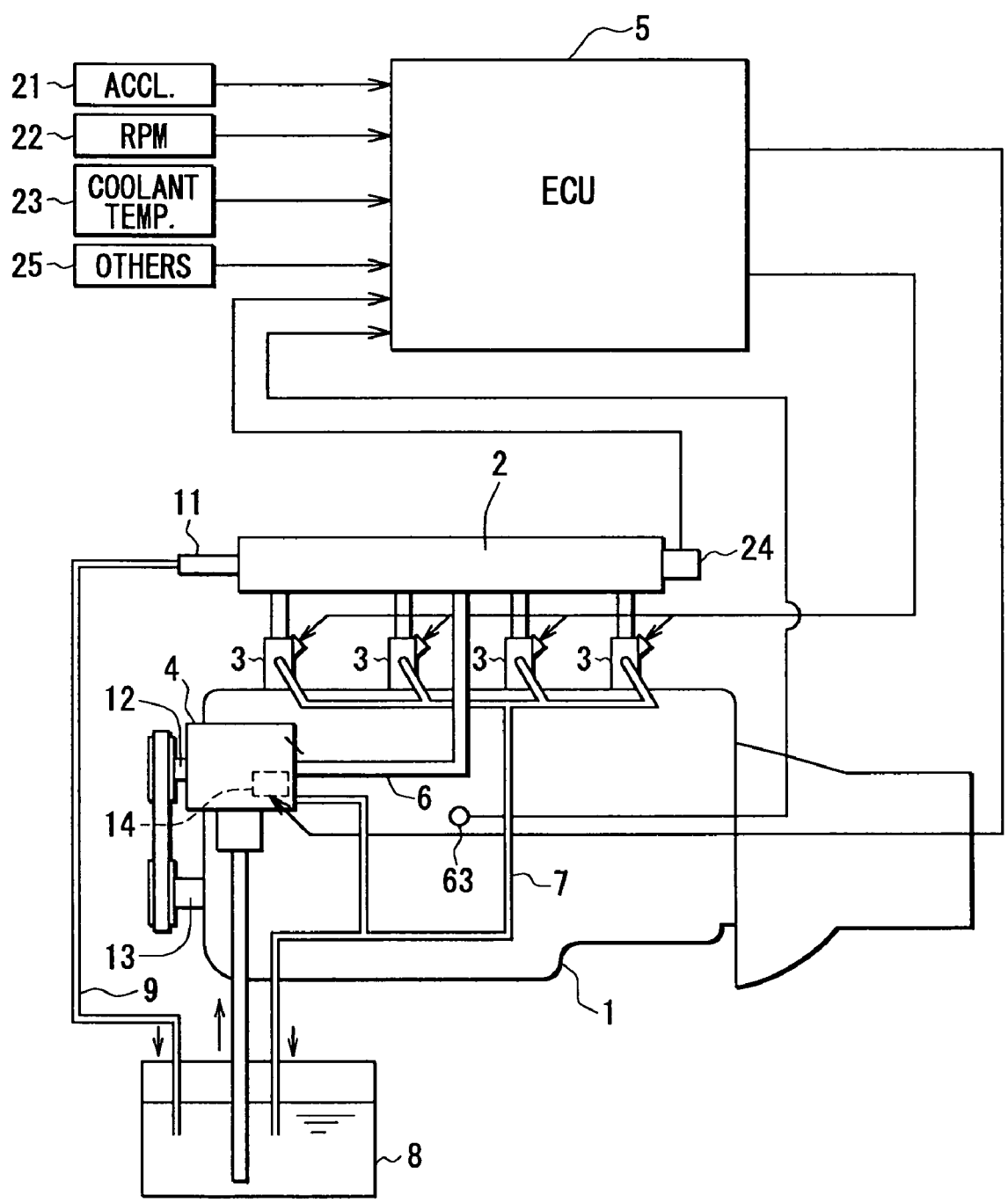
FIG. 11 is a schematic diagram of a common rail type fuel injection system (sixth embodiment)

A misfire sensing means 44 of a sixth embodiment senses the misfire of the engine 1 based on a change in combustion sound of the engine 1. As shown in FIG. 11, a combustion sound sensor 63, which measures the combustion sound through measurement of a vibration of the engine 1, is used as the engine behavior sensing means 46.

The combustion sound sensor 63 is arranged at an appropriate position (e.g., a position around the center of the engine 1) where a combustion vibration of each cylinder can be sensed, so that the combustion sound sensor 63 can sense the combustion sound of each cylinder. Specifically, the combustion sound sensor 63 senses a combustion sound pressure at a predetermined frequency component (a frequency that is suitable for sensing the combustion sound) at a crank angle where the main combustion occurs.

When fuel of the pilot flame generative injection is normally injected, and subsequently fuel of the large heat generative injection is combusted, a combustion sound pressure induced by the main combustion is obtained at a predetermined crank angle interval (e.g., ATDC 10-30 degree CA).

In contrast, when the shortage (fuel shortage) of the pilot flame generative injection occurs, fuel of the large heat generative injection is not combusted, resulting into the misfire. In such a case, a combustion sound pressure, which is lower than the combustion sound pressure of the normal combustion, is observed at the predetermined crank angle interval (e.g., ATDC 10-30 degree CA).

The injection shortage determining means 47 of the sixth embodiment is a program, which senses the combustion sound pressure of the subject cylinder at the predetermined crank angle interval (e.g., ATDC 10-30 degree CA) and determines the subject cylinder as the misfired cylinder when the combustion sound pressure of the subject cylinder is lower than the combustion sound pressure of the normal combustion by an amount that is equal to or greater than a predetermined threshold range.

It is only required to provide the single combustion sound sensor 63, which senses the combustion sound. However, when this technique is applied to the vehicle, which has no combustion sound sensor 63, it will cause an increase in the costs.

However, when the misfired cylinder is identified through the use of the combustion sound sensor 63, a computing load of the ECU 5 can be reduced in comparison to the case where the misfired cylinder is identified based on the engine rotational speed. Furthermore, the reduction in the computing load of the ECU 5 allows an enlargement of the operational range, in which the learning operation (the operation for diagnosing the misfire and for correcting the pilot flame generative injection quantity Qp) can be performed.

Modifications of the above embodiments will now be described. In each of the above embodiments, as an example of the main retarded pilot injection type, there is described the case where the single pilot flame generative injection is executed before the large heat generative injection.

Figure 12A:
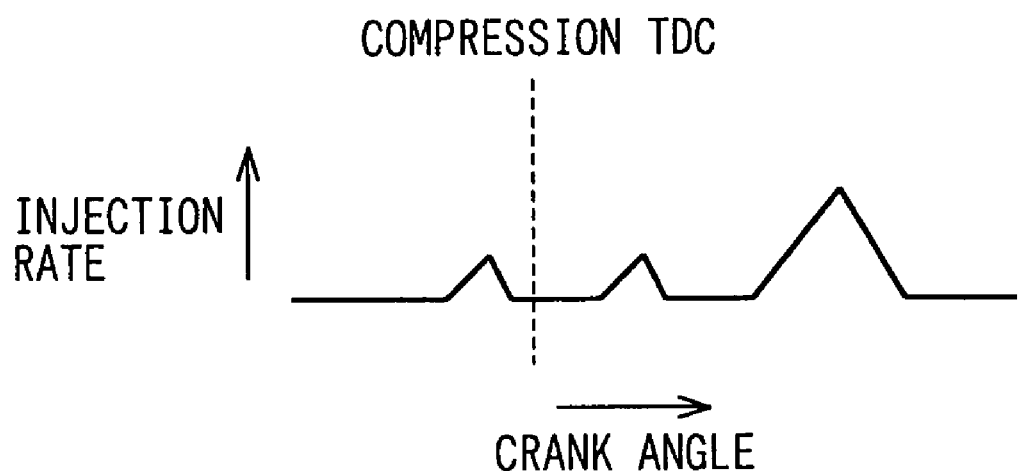
FIGS. 12A and 12B are descriptive views showing different injection patterns (modifications).

Alternatively, as shown in FIG. 12A, multiple pilot flame generative injections (the former stage injections) may be performed before the large heat generative injection. Furthermore, the large heat generative injection may be performed in multiple numbers.

Figure 12B:
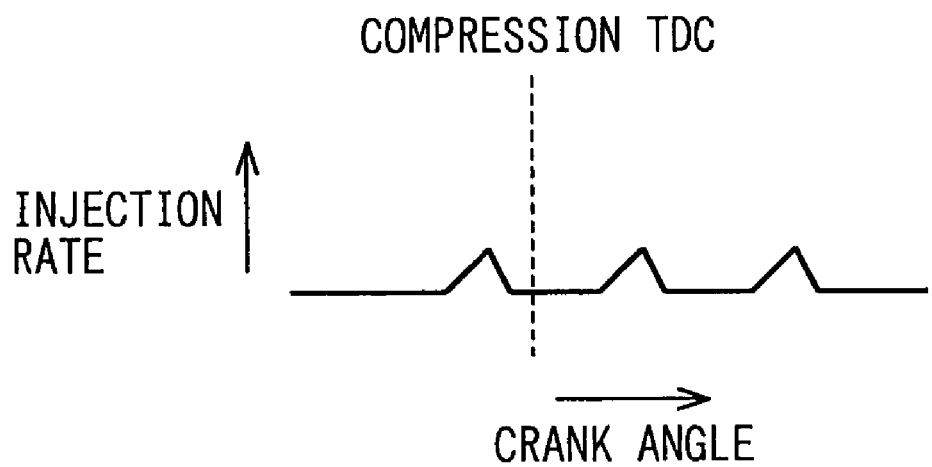

Furthermore, as indicated in FIG. 12B, the present invention may be applied to all of injection types (including injection types that are different from the retarded combustion operation), in each of which the combustions of fuel of the latter stage injections are carried out continuously by taking over the combustion of fuel of the former stage injection.

In the above embodiments, the learning operation (the operation for diagnosing the misfire and for correcting the pilot flame generative injection quantity Qp) is performed at the time of the idling operation. However, the learning operation may also be performed in any other stable operational state of the engine 1, which is other than the idling operation. Furthermore, the operational state of the engine 1 may be divided into multiple layers in the engine rotational speed range, and the pilot flame generative correction quantity Qpi (or the former stage correction quantity) may be obtained for each layer.

In each of the above embodiments, there is described the case where the injectors 3 of the two valve type each having the solenoid vale 32. Alternatively, the present invention may be applied to a diesel engine control system that has injectors, in each of which a linear solenoid (e.g., a piezo-actuator, an electromagnetic actuator) directly drives the needle 33.

In each of the above embodiments, there is described the case where the present invention is applied to the common rail type fuel injection system. Alternatively, the present invention may be applied to a diesel engine control system, which does not use the common rail.

Additional advantages and modifications will readily occur to those skilled in the art. The invention in its broader terms is therefore not limited to the specific details, representative apparatus, and illustrative examples shown and described.

What is claimed is:

1. A method of controlling a diesel engine system for an internal combustion engine having a plurality of cylinders, in each of which former stage injection and subsequent latter stage injection are performed in such a manner that combustion of fuel injected by the former stage injection causes ignition of fuel injected by the latter stage injection, and extinguishment of the combustion of the fuel injected by the former stage injection causes non-ignition of the fuel injected by the latter stage injection, the method comprising:

injecting, through a plurality of injectors, fuel into the plurality of the cylinders, respectively, of the internal combustion engine;

controlling opening and closing of the plurality of injectors based on an operational state of the internal combustion engine, wherein the controlling includes execution of the former stage injection and the subsequent latter stage injection in each of the cylinders through a corresponding one of the injectors; and sensing a misfired one of the plurality of cylinders having misfire in the internal combustion engine, wherein:

the controlling includes increasingly correcting a former stage injection quantity of the former stage injection in the misfired one of the cylinders until elimination of the misfire when the misfire is sensed by said sensing;

the former stage injection is pilot flame generative injection for generating a pilot flame;

the latter stage injection is large heat generative injection for generating large heat;

the controlling includes execution of a retarded combustion operation in such a manner that the large heat generative injection is performed at a retarded angle where sole combustion of the large heat generative injection is normally disabled, and the large heat generative injection is ignited by pilot flame combustion that is executed by compression and ignition of the pilot flame generative injection; and the correcting of the former stage injection quantity correcting is a pilot flame generative injection quantity correcting for increasingly correcting a pilot flame generative injection quantity of the pilot flame generative injection of the misfired one of the cylinders until the elimination of the misfire when the misfire is sensed by said sensing in the retarded combustion operation.

2. A method of controlling a diesel engine control system for an internal combustion engine having a plurality of cylinders, in each of which former stage injection and subsequent latter stage injection are performed in such a manner that combustion of fuel injected by the former stage injection causes ignition of fuel injected by the latter stage injection, and extinguishment of the combustion of the fuel injected by the former stage injection causes non-ignition of the fuel injected by the latter stage injection, the method comprising:

injecting, through a plurality of injectors, fuel into the plurality of the cylinders, respectively, of the internal combustion engine;

controlling opening and closing of the plurality of injectors based on an operational state of the internal combustion engine, wherein the controlling includes execution of the former stage injection and the subsequent latter stage injection in each of the cylinders through a corresponding one of the injectors; and sensing a misfired one of the plurality of cylinders having misfire in the internal combustion engine, wherein:

the controlling includes increasingly correcting a former stage injection quantity of the former stage injection in the misfired one of the cylinders until elimination of the misfire when the misfire is sensed by said sensing; and the controlling also includes:

determining whether a learning condition is satisfied, wherein the learning condition is determined as being satisfied when an operational period of the internal combustion engine becomes equal to or greater than a predetermined interval, and an operational state of the internal combustion engine is stabilized;

adjusting the operational state of the internal combustion engine to a misfire inducing state, at which misfire is prone to occur due to shortage of the former stage injection quantity of the former stage injection, when the learning condition is determined as being satisfied;

progressively increasing the former stage injection quantity of the misfired one of the plurality of cylinders when the misfire is sensed;

storing a former stage correction quantity, which is used to correct the former stage injection quantity of the misfired one of the plurality of cylinders and is implemented at time of the elimination of the misfire when the former stage injection quantity of the misfired one of the plurality of cylinders is progressively increased; and reflecting the former stage correction quantity, which is stored in a correction quantity storage memory, into another former stage injection quantity.

3. A diesel engine control system for an internal combustion engine having a plurality of cylinders, in each of which former stage injection and subsequent latter stage injection are performed in such a manner that combustion of fuel injected by the former stage injection causes ignition of fuel injected by the latter stage injection, and extinguishment of the combustion of the fuel injected by the former stage injection causes non ignition of the fuel injected by the latter stage injection, the diesel engine control system comprising:

a plurality of injectors that inject fuel into the plurality of the cylinders, respectively, of the internal combustion engine;

a control device that controls opening and closing of the plurality of injectors based on an operational state of the internal combustion engine, wherein the control device executes the former stage injection and the subsequent latter stage injection in each of the cylinders through a corresponding one of the injectors; and a misfire sensing means for sensing a misfired one of the plurality of cylinders having misfire in the internal combustion engine, wherein:

the control device includes a former stage injection quantity correcting means for increasingly correcting a former stage injection quantity of the former stage injection in the misfired one of the cylinders until elimination of the misfire when the misfire is sensed by the misfire sensing means;

the former stage injection is pilot flame generative injection for generating a pilot flame;

the latter stage injection is large heat generative injection for generating large heat;

the control device executes a retarded combustion operation in such a manner that the large heat generative injection is performed at a retarded angle where sole combustion of the large heat generative injection is normally disabled, and the large heat generative injection is ignited by pilot flame combustion that is executed by compression and ignition of the pilot flame generative injection; and the former stage injection quantity correcting means is a pilot flame generative injection quantity correcting means for increasingly correcting a pilot flame generative injection quantity of the pilot flame generative injection of the misfired one of the cylinders until the elimination of the misfire when the misfire is sensed by the misfire sensing means in the retarded combustion operation.

4. The diesel engine control system according to claim 3, wherein the former stage injection quantity correcting means increasingly corrects the former stage injection quantity by one of:

increasing an energizing time period of the injector; and increasing a supply pressure of fuel, which is injected into the injector.

5. The diesel engine control system according to claim 3, wherein the former stage injection quantity correcting means includes an abnormality determining means for determining an occurrence of abnormality when a former stage correction quantity, which is used to correct the former stage injection quantity, exceeds a preset threshold value.

6. The diesel engine control system according to claim 3, wherein the misfire sensing means senses the misfire in the internal combustion engine based on a change in a rotational speed of the internal combustion engine.

7. The diesel engine control system according to claim 3, wherein the misfire sensing means senses the misfire in the internal combustion engine based on a change in an exhaust gas temperature of the internal combustion engine.

8. The diesel engine control system according to claim 3, wherein the misfire sensing means senses the misfire in the internal combustion engine based on a change in an air-to-fuel ratio in exhaust gas of the internal combustion engine.

9. The diesel engine control system according to claim 3, wherein the misfire sensing means senses the misfire in the internal combustion engine based on a change in a cylinder pressure, which is a pressure in the cylinder of the internal combustion engine.

10. The diesel engine control system according to claim 3, wherein the misfire sensing means senses the misfire in the internal combustion engine based on a change in an ion current value in the cylinder of the internal combustion engine.

11. The diesel engine control system according to claim 3, wherein the misfire sensing means senses the misfire in the internal combustion engine based on a change in combustion sound of the internal combustion engine.

12. The diesel engine control system according to claim 3, wherein the control device includes:

a learning execution determining means for determining whether a learning condition is satisfied, wherein the learning execution determining means determines that the learning condition is satisfied when an operational period of the internal combustion engine becomes equal to or greater than a predetermined interval, and an operational state of the internal combustion engine is stabilized;

an operational state adjusting means for adjusting the operational state of the internal combustion engine to a misfire inducing state, at which misfire is prone to occur due to shortage of the former stage injection quantity of the former stage injection, when the learning execution determining means determines that the learning condition is satisfied;

a progressively increasing means for progressively increasing the former stage injection quantity of the misfired one of the plurality of cylinders when the misfire sensing means senses the misfire;

a correction quantity storage means for storing a former stage correction quantity, which is used to correct the former stage injection quantity of the misfired one of the plurality of cylinders and is implemented at time of the elimination of the misfire when the progressively increasing means progressively increases the former stage injection quantity of the misfired one of the plurality of cylinders; and a correction reflecting means for reflecting the former stage correction quantity, which is stored in the correction quantity storage means, into another former stage injection quantity.

13. The diesel engine control system according to claim 12, wherein the progressively increasing means corrects the former stage injection quantity through use of an initially rapidly increasing pattern, in which a relatively large increase rate of the former stage correction quantity exists at initial small injection numbers, and then the increase rate of the former stage correction quantity is reduced when the injection number is increased during continuation of the misfire.

14. A diesel engine control system for an internal combustion engine having a plurality of cylinders, in each of which former stage injection and subsequent latter stage injection are performed in such a manner that combustion of fuel injected by the former stage injection causes ignition of fuel injected by the latter stage injection, and extinguishment of the combustion of the fuel injected by the former stage injection causes non ignition of the fuel injected by the latter stage injection, the diesel engine control system comprising:

a plurality of injectors that inject fuel into the plurality, of the cylinders, respectively, of the internal combustion engine;

a control device that controls opening and closing of the plurality of injectors based on an operational state of the internal combustion engine, wherein the control device executes the former stage injection and the subsequent latter stage injection in each of the cylinders through a corresponding one of the injectors; and a misfire sensing means for sensing a misfired one of the plurality of cylinders having misfire in the internal combustion engine, wherein:

the control device includes a former stage injection quantity correcting means for increasingly correcting a former stage injection quantity of the former stage injection in the misfired one of the cylinders until elimination of the misfire when the misfire is sensed by the misfire sensing means; and the control device includes:

a learning execution determining means for determining whether a learning condition is satisfied, wherein the learning execution determining means determines that the learning condition is satisfied when an operational period of the internal combustion engine becomes equal to or greater than a predetermined interval, and an operational state of the internal combustion engine is stabilized;

an operational state adjusting means for adjusting the operational state of the internal combustion engine to a misfire inducing state, at which misfire is prone to occur due to shortage of the former stage injection quantity of the former stage injection, when the learning execution determining means determines that the learning condition is satisfied;

a progressively increasing means for progressively increasing the former stage injection quantity of the misfired one of the plurality of cylinders when the misfire sensing means senses the misfire;

a correction quantity storage means for storing a former stage correction quantity, which is used to correct the former stage injection quantity of the misfired one of the plurality of cylinders and is implemented at time of the elimination of the misfire when the progressively increasing means progressively increases the former stage injection quantity of the misfired one of the plurality of cylinders; and a correction reflecting means for reflecting the former stage correction quantity, which is stored in the correction quantity storage means, into another former stage injection quantity.

15. The diesel engine control system according to claim 14, wherein the progressively increasing means corrects the former stage injection quantity through use of an initially rapidly increasing pattern, in which a relatively large increase rate of the former stage correction quantity exists at initial small injection numbers, and then the increase rate of the former stage correction quantity is reduced when the injection number is increased during continuation of the misfire.

16. The diesel engine control system according to claim 14, wherein the former stage injection quantity correcting means increasingly corrects the former stage injection quantity by one of:

increasing an energizing time period of the injector; and increasing a supply pressure of fuel, which is injected into the injector.

17. The diesel engine control system according to claim 14, wherein the former stage injection quantity correcting means includes an abnormality determining means for determining an occurrence of abnormality when a former stage correction quantity, which is used to correct the former stage injection quantity, exceeds a preset threshold value.

18. The diesel engine control system according to claim 14, wherein the misfire sensing means senses the misfire in the internal combustion engine based on a change in a rotational speed of the internal combustion engine.

19. The diesel engine control system according to claim 14, wherein the misfire sensing means senses the misfire in the internal combustion engine based on a change in an exhaust gas temperature of the internal combustion engine.

20. The diesel engine control system according to claim 14, wherein the misfire sensing means senses the misfire in the internal combustion engine based on a change in an air-to-fuel ratio in exhaust gas of the internal combustion engine.

21. The diesel engine control system according to claim 14, wherein the misfire sensing means senses the misfire in the internal combustion engine based on a change in a cylinder pressure, which is a pressure in the cylinder of the internal combustion engine.

22. The diesel engine control system according to claim 14, wherein the misfire sensing means senses the misfire in the internal combustion engine based on a change in an ion current value in the cylinder of the internal combustion engine.

23. The diesel engine control system according to claim 14, wherein the misfire sensing means senses the misfire in the internal combustion engine based on a change in combustion sound of the internal combustion engine.

* * * * *